(12) United States Patent
Andrianov et al.

(10) Patent No.: US 10,938,638 B2
(45) Date of Patent: Mar. 2, 2021

(54) METHOD AND APPARATUS FOR VIRTUALIZED NETWORK FUNCTION DECOMPOSITION

(71) Applicant: NOKIA SOLUTIONS AND NETWORKS OY, Espoo (FI)

(72) Inventors: Anatoly Andrianov, Schaumburg, FL (US); Gyula Bodog, Budapest (HU); Mehmet Ersue, Munich (DE); Uwe Rauschenbach, Poing (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 54 days.

(21) Appl. No.: 15/770,909

(22) PCT Filed: Oct. 26, 2016

(86) PCT No.: PCT/US2016/058853
§ 371 (c)(1),
(2) Date: Apr. 25, 2018

(87) PCT Pub. No.: WO2017/075046
PCT Pub. Date: May 4, 2017

(65) Prior Publication Data
US 2018/0309626 A1 Oct. 25, 2018

Related U.S. Application Data

(60) Provisional application No. 62/246,313, filed on Oct. 26, 2015.

(51) Int. Cl.
*H04L 12/24* (2006.01)
*G06F 9/455* (2018.01)
*G06F 9/50* (2006.01)

(52) U.S. Cl.
CPC ...... *H04L 41/0806* (2013.01); *G06F 9/45558* (2013.01); *G06F 9/5077* (2013.01);
(Continued)

(58) Field of Classification Search
CPC ............. H04L 41/0806; H04L 41/0813; H04L 41/0866; H04L 41/0896; G06F 9/45558;
(Continued)

(56) References Cited

U.S. PATENT DOCUMENTS 8,762,501 B2   6/2014 James et al.
9,979,602 B1 * 5/2018 Chinnakannan ........ H04L 41/12
(Continued)

FOREIGN PATENT DOCUMENTS

WO    WO 2014/131462 A1    9/2014

OTHER PUBLICATIONS

European Telecommunications Standards Institute (ETSI). "Network Functions Virtualisation (NFV); Acceleration Technologies; VNF Interfaces Specification", ETSI GS NFV-IFA 002 V2.1.1 (Mar. 2016), 30 pages. (Year: 2016).*

(Continued)

*Primary Examiner* — George C Neurauter, Jr.
(74) *Attorney, Agent, or Firm* — Squire Patton Boggs (US) LLP (57) ABSTRACT

Systems, methods, apparatuses, and computer program products for virtualized network function (VNF) decomposition are provided. An embodiment of the invention includes to first decompose the Network Function into smaller blocks: application, platform, and resources (i.e., compute, network, and storage), then manage the decomposed application and platform parts by separate entities (e.g., EM/VNFM). This decomposition may be applied to the Network Elements (i.e., the current building blocks of telecommunication networks) and to the VNFs.

7 Claims, 7 Drawing Sheets

(52) U.S. Cl.
CPC ...... *H04L 41/0813* (2013.01); *H04L 41/0866* (2013.01); *H04L 41/0896* (2013.01); *G06F 2009/4557* (2013.01); *G06F 2009/45595* (2013.01)

(58) Field of Classification Search
CPC ........... G06F 9/5077; G06F 2009/4557; G06F 2009/45595
See application file for complete search history.

(56) References Cited

U.S. PATENT DOCUMENTS

| | | | |
|---|---|---|---|
| 10,263,911 B2* | 4/2019 | Xiang | H04L 47/781 |
| 10,397,132 B2* | 8/2019 | Xia | |
| 2013/0121209 A1 | 5/2013 | Padmanabhan et al. | |
| 2014/0201374 A1 | 7/2014 | Ashwood-Smith et al. | |
| 2015/0082308 A1 | 3/2015 | Kiess et al. | |
| 2015/0244643 A1 | 8/2015 | Kinoshita et al. | |
| 2016/0205004 A1* | 7/2016 | Chou | H04L 43/08 709/224 |
| 2017/0150399 A1* | 5/2017 | Kedalagudde | H04W 28/08 |
| 2018/0024852 A1* | 1/2018 | Yabushita | G06F 9/45558 718/1 |
| 2018/0205786 A1* | 7/2018 | Dong | H04L 67/1034 |
| 2018/0262410 A1* | 9/2018 | Chou | G06F 9/45558 |
| 2018/0351824 A1* | 12/2018 | Giust | G06F 9/542 |
| 2019/0007899 A1* | 1/2019 | Vrzic | H04W 48/18 |
| 2019/0052528 A1* | 2/2019 | Yoshimura | H04L 41/0813 |
| 2019/0171492 A1* | 6/2019 | Yousaf | G06F 9/5061 |
| 2019/0238404 A1* | 8/2019 | Yao | G06F 9/45558 |
| 2019/0253264 A1* | 8/2019 | Singaravelu | H04L 9/0827 |

OTHER PUBLICATIONS

European Telecommunications Standards Institute (ETSI). "Network Functions Virtualisation (NFV); Architectural Framework", ETSI GS NFV 002 V1.2.1 (Dec. 2014), 21 pages. (Year: 2014).*
European Telecommunications Standards Institute (ETSI). "Network Functions Virtualisation (NFV); Infrastructure; Compute Domain", ETSI GS NFV-INF 003 V1.1.1 (Dec. 2014), 57 pages. (Year: 2014).*
European Telecommunications Standards Institute (ETSI). "Network Functions Virtualisation (NFV); Infrastructure; Hypervisor Domain", ETSI GS NFV-INF 004 V1.1.1 (Jan. 2015), 49 pages. (Year: 2015).*
European Telecommunications Standards Institute (ETSI). "Network Functions Virtualisation (NFV); Infrastructure; Network Domain", ETSI GS NFV-INF 005 V1.1.1 (Dec. 2014), 53 pages. (Year: 2014).*
Diomidis S. Michalopoulos et al. "Network Slicing via Function Decomposition and Flexible Network Design", 2017 IEEE 28th Annual International Symposium on Personal, Indoor, and Mobile Radio Communications (PIMRC), Oct. 8-13, 2017, 6 pages. (Year: 2017).*
ETSI. "Network Functions Virtualisation (NFV); Architectural Framework", ETSI GS NFV 002 V1.2.1 (Dec. 2014), 21 pages.*
Bo Wang et al. "Short Paper: Lightweight VNF Manager Solution for Virtual Functions", 2015 18th International Conference on Intelligence in Next Generation Networks, Feb. 2015, 3 pages.*
Bo Han, Vijay Gopalakrishnan, Lusheng Ji, and Seungjoon Lee. "Network Function Virtualization: Callenges and Opportunities for Innovations", IEEE Communications Magazine, Feb. 2015, 8 pages.*
Rashid Mijumbi, Joan Serrat, Juan-Luis Gorricho, Niels Bouten, Filip De Turck,. and Raouf Boutaba. "Network Function Virtualization: State-of-the-art and Research Challenges", published by IEEE on Sep. 4, 2015, 28 pages.*
Stuart Clayman, Elisa Maini, Alex Galis, Antonio Manzalini, and Nicola Mazzocca. "The Dynamic Placement of Virtual Network Functions", 2014 IEEE Network Operations and Management Symposium (NOMS), May 2014, 9 pages.*
Apr. 29, 2019 Office Action issued in European Patent Application No. 16860682.0.
International Search Report & Written Opinion dated Jan. 17, 2017 corresponding to International Patent Application No. PCT/US2016/058853.
ETSI GS NFV-SWA 001 V1.1.1 (Dec. 2014), Group Specification, "Network Functions Virtualisation (NFV); Virtual Network Functions Architecture," ETSI, Dec. 2014.
ETSI GS NFV-MAN 001 V1.1.1 (Dec. 2014), Group Specification, "Network Functions Virtualisation (NFV); Management and Orchestration," ETSI, Dec. 2014.
ETSI GS NFV-SWA 001; V0.2.3; "Network Functions Virtualisation (NFV); Virtual Network Functions Architecture", XP14220760A1; (Oct. 2014), pp. 1-95.
ETSI GS IVA 009, V0.4.0; "Network Function Virtualization (NFV) Management and Orchestration Report on Architectural Options", XP14256016, (Aug. 2015), pp. 1-23.
Draft ETSI GS NFV-EVE 005; V0.2.0; "Network Functions Virtualisation (NFV); Ecosystem: Report on SDN Usage in NFV Architectural Framework", XP14263316A1, (Sep. 2015), pp. 1-130.
European Search Report application No. 16860682.0 dated Apr. 9, 2019.
ETSI GS NFV-INF 001 V1.1.1 (Jan. 2015), Group Specification, "Network Functions Virtualisation (NFV); Infrastructure Overview," ESTI, Jan. 2015.

* cited by examiner

METHOD AND APPARATUS FOR VIRTUALIZED NETWORK FUNCTION DECOMPOSITION

CROSS-REFERENCE TO RELATED APPLICATIONS

This application claims priority from U.S. Provisional Application No. 62/246,313, filed on Oct. 26, 2015. The entire contents of this earlier filed application are hereby incorporated by reference in their entirety.

BACKGROUND

Field

Some embodiments generally relate to virtualized network function (VNF) management. In particular, certain embodiments are directed to supporting the management of virtualized network functions (VNFs) in a way that is "compatible" with existing network element-based management of telecommunications networks.

Description of the Related Art

Network functions virtualization (NFV) refers to a network architecture concept that uses the technologies of information technology (IT) virtualization to virtualize entire classes of network node functions into building blocks that may connect, or chain together, to create communication services.

A virtualized network function (VNF) may be designed to consolidate and deliver the networking components necessary to support a full virtualized environment. A VNF may be comprised of one or more virtual machines running different software and processes, on top of standard high-volume servers, switches and storage, or even cloud computing infrastructure, instead of having custom hardware appliances for each network function. One example of a VNF may be a virtual session border controller deployed to protect a network without the typical cost and complexity of obtaining and installing physical units. Other examples include virtualized load balancers, firewalls, intrusion detection devices and WAN accelerators.

In an NFV environment, a VNF may take on the responsibility of handling specific network functions that run on one or more virtualized containers on top of Network Functions Virtualization Infrastructure (NFVI) or hardware networking infrastructure, such as routers, switches, etc. Individual virtualized network functions (VNFs) can be connected or combined to form a so called Network Service to offer a full-scale networking communication service.

Virtual network functions came about as service providers attempted to accelerate deployment of new network services in order to advance their revenue and expansion plans. Since hardware-based devices limited their ability to achieve these goals, they looked to IT virtualization technologies and found that virtualized network functions helped accelerate service innovation and provisioning. As a result, several providers came together to create the Network Functions Virtualization industry specification (ETSI ISG NFV group) under the European Telecommunications Standards Institute (ETSI). ETSI ISG NFV has defined the basic requirements and architecture of network functions virtualization.

SUMMARY

One embodiment is directed to a method, which may include decomposing a network function into smaller blocks of an application part, platform part, and resources part. The network function comprises at least one of a physical network function or a virtualized network function. The method may further include instantiating the virtualized network function platform part by a network entity, configuring the virtualized network function platform part by the network entity, instantiating the virtualized network function application part by another network entity, and configuring the virtualized network function application part by said another network entity.

Another embodiment is directed to an apparatus, which may include decomposing means for decomposing a network function into smaller blocks of an application part, platform part, and resources part. The network function comprises at least one of a physical network function or a virtualized network function. The apparatus may further include platform instantiating means for instantiating the virtualized network function platform part by a network entity, platform configuring means for configuring the virtualized network function platform part by the network entity, application instantiating means for instantiating the virtualized network function application part by another network entity, and application configuring means for configuring the virtualized network function application part by said another network entity.

Another embodiment is directed to an apparatus including at least one processor and at least one memory including computer program code. The at least one memory and the computer program code are configured, with the at least one processor, to cause the apparatus at least to decompose a network function into smaller blocks of an application part, platform part, and resources part, where the network function comprises at least one of a physical network function or a virtualized network function, to instantiate the virtualized network function platform part by a network entity, to configure the virtualized network function platform part by the network entity, to instantiate the virtualized network function application part by another network entity, and to configure the virtualized network function application part by said another network entity.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for virtualized network function (VNF) decomposition, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

The ETSI industry specification group for NFV uses the following definition of the Virtualized Network Function: " . . . implementation of an NF that can be deployed on a Network Function Virtualization Infrastructure (NFVI)". The Network Function (NF) is in turn defined as: " . . . functional block within a network infrastructure that has well-defined external interfaces and well-defined functional behavior. NOTE: In practical terms, a Network Function is today often a network node or physical appliance."

These definitions created in early phase of ETSI NFV work do not cover fully the cases where virtualized NFs have a complex internal structure and require domain-specific management support. For example, in case of 3GPP core virtualization, the vMME or vIMS cannot be managed by application-agnostic MANO functional blocks (NFVO, VNFM, VIM) as simple black boxes with a limited set of standardized configuration parameters. These boxes literally have thousands of configuration attributes (many of them vendor specific) that need to be managed in close coordination with configuration of neighboring Network Elements (both virtualized and non-virtualized) and with overall end-to-end service view. Current approach to the configuration of complex VNFs is the use of traditional Element Manager functional blocks. The protection of capital investments for operators deploying VNFs in existing networks, advocates the common approach to management of the legacy physical network functions (PNFs) with the new VNFs. The applications running on PNFs and on VNFs need to be manageable in exactly same way.

The virtualization specific aspects of VNFs should be transparent to the Operators. For example, the Operator does not need to be aware of underlying details and potential complexity associated with virtualization. Therefore, it is important to maintain a clear layering separation between applications and underlying virtualization.

The two approaches—unified management approach and clear layering separation—may be viewed as having contradicting goals, causing problems with clearly defining the scope of management entities responsible for application virtualization layers. On one side, the application management functions do not need to be burdened with complexity and dynamism associated to virtualization; on other side, the virtualization management functions do not need to be burdened with detailed knowledge of the applications and services.

In a telecommunication environment, this problem is aggravated by the fact that there are multiple SDOs involved in standardization of application and virtualization aspects of a single entity currently defined as VNF. Without VNF decomposition it is impossible to clearly identify what part of a VNF is "virtualization-specific" and what part is "application-specific".

An embodiment of the invention includes to first decompose the Network Function into smaller blocks: application, platform, and resources (i.e., compute, network, and storage). The next step is to apply these decomposition principles to the Network Elements (NEs—the current building blocks of telecommunication networks) and to the VNFs. A goal of this decomposition is to support the management of VNFs in a way "compatible" with the existing NE-based management of telecommunication networks.

Figure 1:
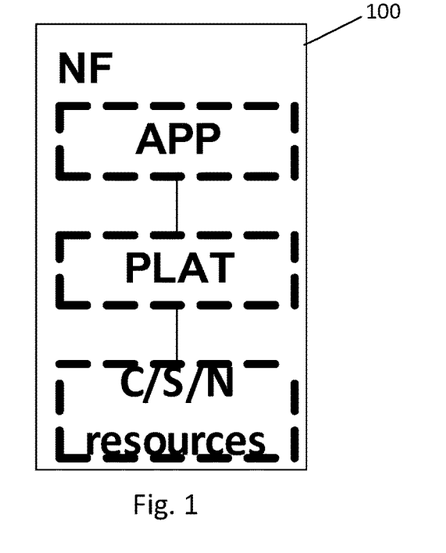
FIG. 1 illustrates an example of the decomposition of a Network Function (NF), according to an embodiment.

FIG. 1 illustrates an example of the decomposition of a Network Function 100, according to one embodiment. As illustrated in FIG. 1, one embodiment includes an additional composition of just the VNF part into application logic (APP) and platform component (PLAT) allowing them to be managed by different entities implemented to different standard. VNF's application part may be instantiated by an element manager, and VNF's platform part may be instantiated by a virtualized network function manager.

Figure 2:
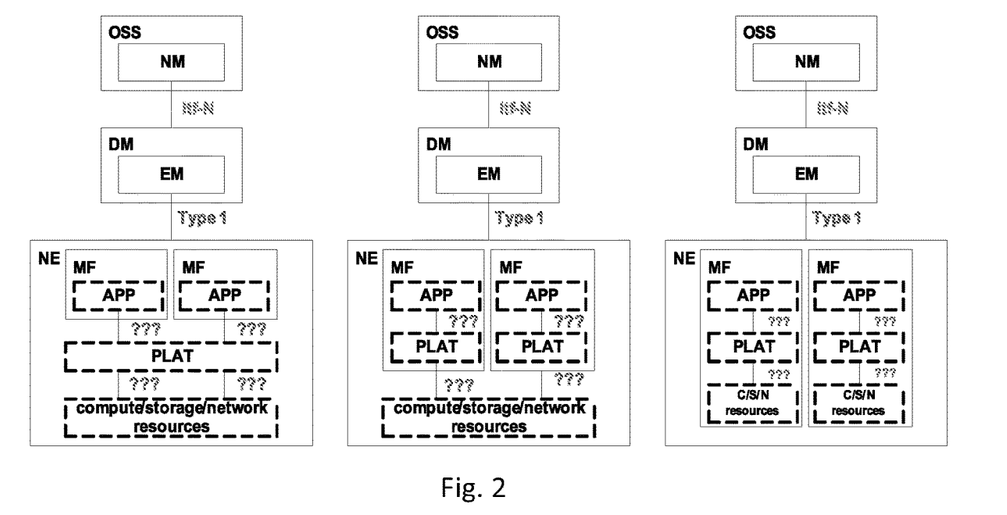
FIG. 2 illustrates an example of the possible approaches to the decomposition of a Network Element (NE) in the context of a management system, according to an embodiment.
Figure 3:
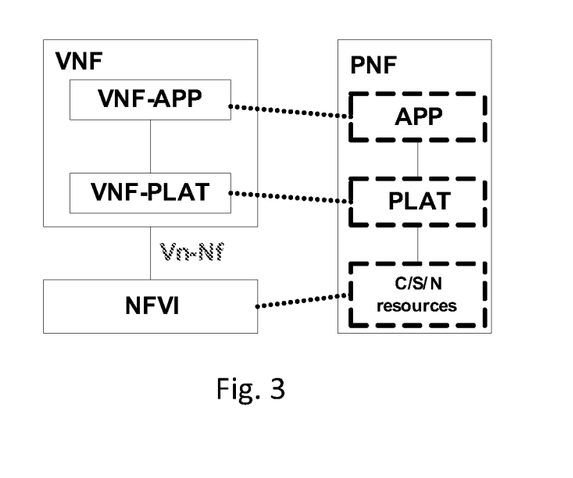
FIG. 3 illustrates an example of the mapping of NF decomposition to VNF decomposition in the NFV environment, according to an embodiment.

FIG. 2 illustrates an example of the possible approaches to the decomposition of a Network Element (NE) in the context of a management system, according to an embodiment. FIG. 3 illustrates an example of the mapping of NF decomposition to VNF decomposition in the NFV environment, according to an embodiment. The compute/network and storage resources are in the NFVI. On top of the NFVI is the virtualized network platform. In another example, a cloud stack may be implemented on top of the NFVI. On top of the cloud stack may be implemented its application embedded to a virtualization container.

Figure 4:
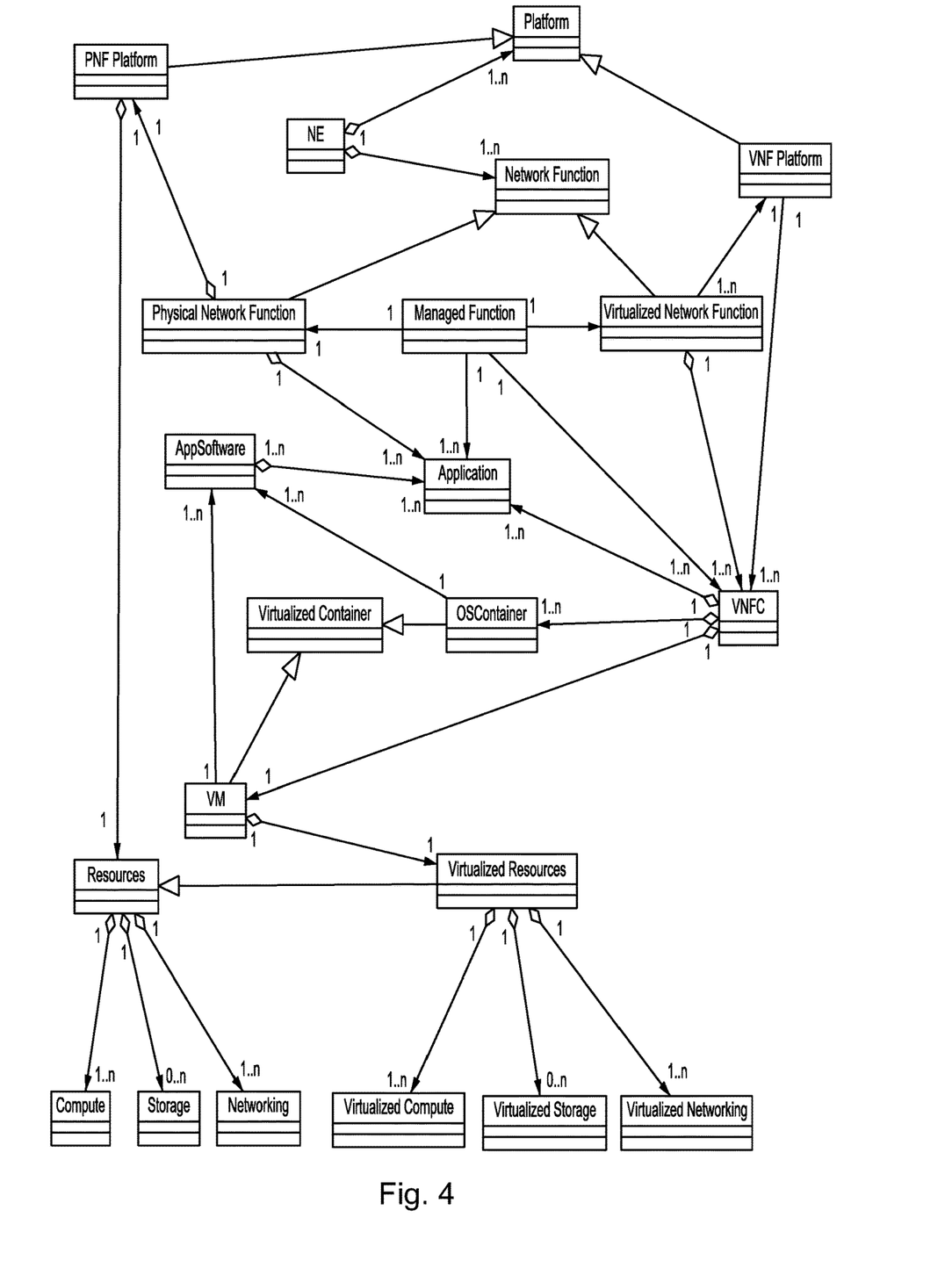
FIG. 4 illustrates an example unified modeling language (UML) model of the decomposition of VNF and PNF and the relationships between the different components, according to one embodiment.

FIG. 4 illustrates an example unified modeling language (UML) model of the decomposition of VNF and PNF and the relationships between the different components, according to one embodiment. A Network Function can be either a Physical Network Function or a Virtualized Network Function. Both Physical Network Function and Virtualized Network Function contain the application logic APP and both have a platform component PLAT.

In case of a Physical Network Function, the platform component PLAT provides access for the APP component to the actual hardware resources. A managed function MF bundles entities that can be managed as a whole. FIG. 2 provides examples how MFs, APP instances and PLAT instances may relate in Physical Network Functions. Multiple APP instances (1 . . . n) may share the same platform PLAT, but be different MFs. Multiple PLAT instances (1 . . . n) may run in parallel on the same physical resources; and each MF may contain an APP instance and the associated PLAT instance. Finally, the physical resources may be divided such that a MF includes a number of physical resources, the PLAT instance running on it, and the APP instance running on top of PLAT. The interfaces tagged with "???" in FIG. 2 may not require standardization.

In case of a Virtualized Network Function, the physical resources are provided by the NFVI. The platform component VNF-PLAT corresponds to a "Virtualization Container" on top of which the APP component runs. Virtualization Containers are provided by a cloud stack that is responsible to hide the hardware details from the application. A Virtualization Container may either be a virtual machine (VM) in hypervisor-based virtualization, or an operating system container (examples are LXC containers, Docker containers). In case of VMs, VNF-PLAT may only include virtualized (i.e., emulated) hardware, or may include both the emulated hardware and the operating system running on that hardware. In case of Operating system containers, VNF-PLAT includes the operating system. Typically, a VNF is decomposed into VNF Components (VNFC), each of which includes an APP part and a PLAT part. The PLAT part of a VNFC corresponds to a Virtualization Container, which itself corresponds to a VM. The application part may be realized by the Application Software.

The resources class represents the needed hardware (HW) resources. In case of a Virtualized Network Function, it represents the virtualized resources.

Figure 5:
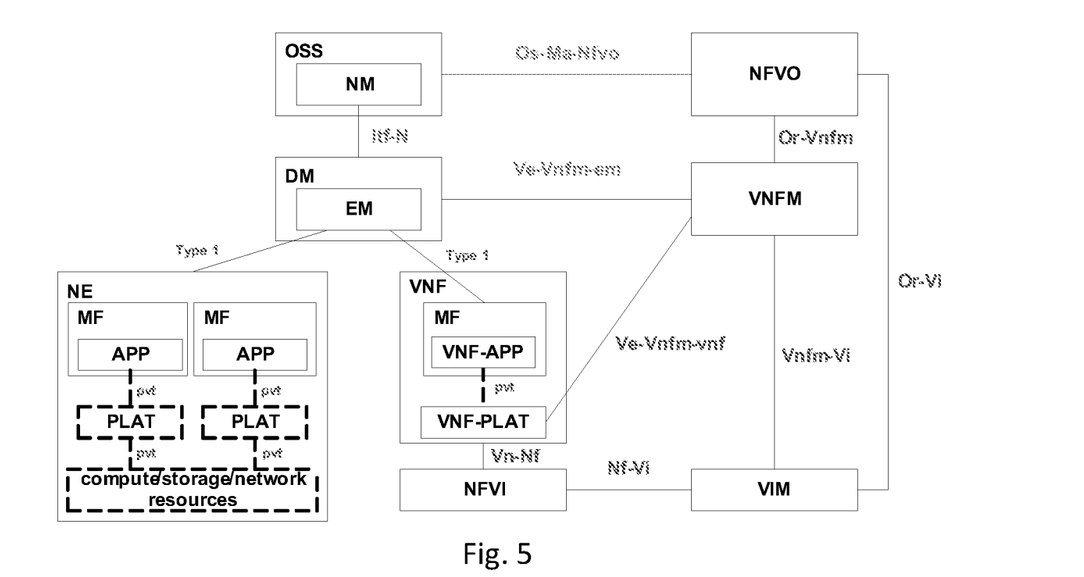
FIG. 5 illustrates an example of the management entities and their relationship to the VNF and PNF decomposed functions, according to an embodiment.

One benefit of this kind of decomposition is that it makes very clear what is the application-specific part of a VNF (managed by an Element Manager), and what is the virtualization-specific of a VNF (managed by a VNFM). FIG. 5 illustrates the management entities and their relationship to the VNF and PNF decomposed functions. In FIG. 5, interfaces that may not require standardization are tagged as "pvt".

Figure 6:
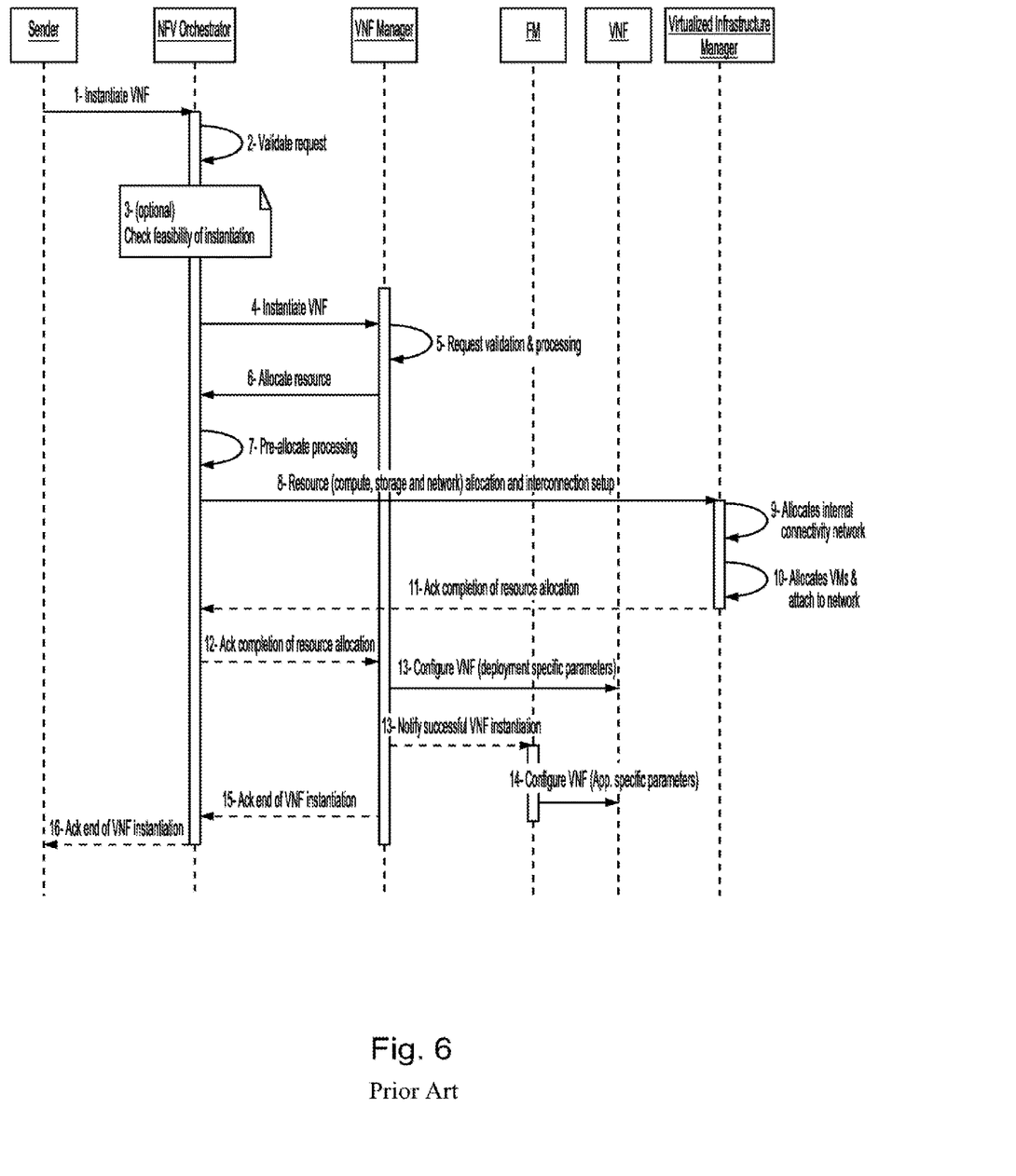
FIG. 6 illustrates the VNF instantiation flow documented in ETSI NFV GS MAN001.

FIG. 6 illustrates the VNF instantiation flow documented in ETSI NFV GS MAN001. The deployment specific configuration step (step 13 in FIG. 6) does not provide sufficient separation of the management responsibilities (is not limited to virtualization-specific only aspects of management) between the MANO functions and the application management functions. This method instantiates the virtualized resources necessary for the virtualized platform, but does not consider the instantiation of the application.

Figure 7:
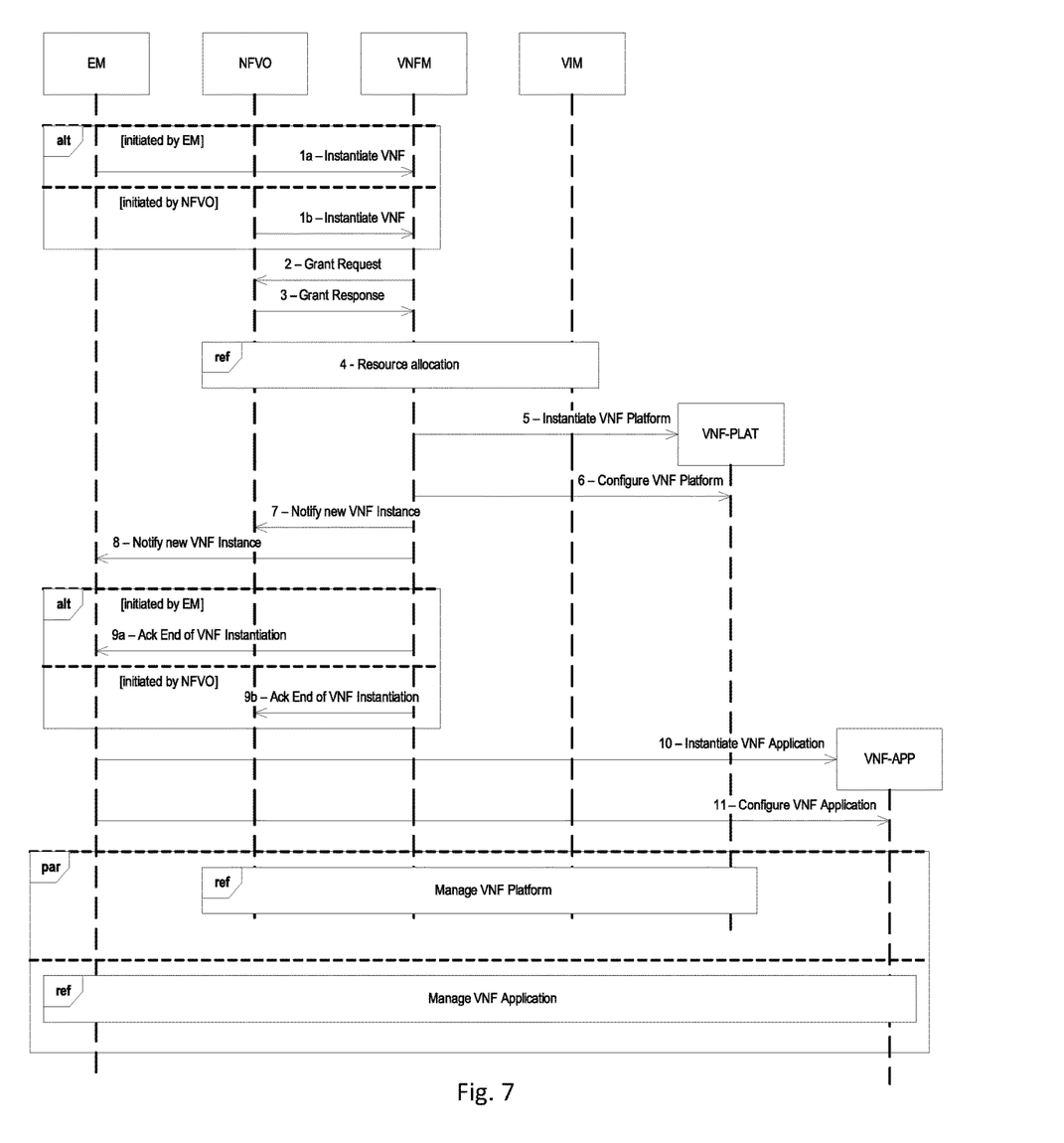
FIG. 7 illustrates the VNF instantiation flow based on the VNF decomposition, according to an embodiment.

Therefore, FIG. 7 illustrates the new VNF instantiation flow based on the VNF decomposition, according to an embodiment of the invention. The instantiation flow of FIG. 7 includes the following steps:

1. According to this embodiment, the VNF instantiation may be initiated either by VNFM (e.g., as part of NS instantiation or NS Lifecycle Management) or by EM (e.g. based on a request received from NM). Alternative steps 1a/1b show the VNF instantiation request to the VNFM.
2. All LCM operations performed by VNFM require granting by NFV orchestrator NFVO. Step 2 shows the grant request from VNFM to NFVO.
3. Step 3 shows the grant response (positive in this scenario) from NFVO to VNFM.
4. Step 4 refers to the resource allocation procedure between VNFM, NFVO and VIM.
5. Step 5 shows the VNF Platform instantiation by the VNFM. Here the VNF Platform instantiation means the instantiation of the required amount of Virtual Machines (an example of "blank" could mean in certain embodiments that only OS is available) with the required resources only; or OS containers (Docker containers or LXC being example technologies).
6. Step 6 shows the VNF Platform configuration replacing the currently agreed "VNF Initial Configuration" step in VNF instantiation flow (see step 13 in FIG. 6). This means the necessary configuration of the Virtual Machines or Containers, e.g. networking configuration between VMs or containers.
7. The MANO procedure of VNF instantiation ends with notifications about the new VNF instance (new VNF Platform) to the NFVO and corresponding EM (identified in the "Instantiate VNF" request). Step 7 shows notification to the NFVO
8. Step 8 shows the notification about the new VNF Platform sent to the EM. The order of steps 7 and 8 is not important, as their order can be interchanged.
9. Step 9 shows the notification (result of operation) to the initiator about the end of VNF instantiation flow performed by MANO Functional Blocks (FB). Step 9a is used in case of VNF instantiation initiated by the EM, step 9b is used in case of VNF instantiation initiated by NFVO.
10. After successful VNF Platform instantiation, the EM installs the VNF application on the newly instantiated VNF platform. The step 10 "Instantiate VNF Application" may include the application package download on to VNF Platform, software install, etc. . . .
11. After successful VNF application instantiation, the EM performs the VNF application level configuration shown as step 11.

In this embodiment, the management of VNF Platform starts from step 6 and may be performed exclusively by MANO FBs. In an embodiment, the management of VNF Application starts from step 11 and may be performed exclusively by EM. The two management activities happen independently from each other—MANO FBs do not "touch" the application, and the EM does not "touch" the platform. The communication between VNF application and platform components may happen in a proprietary way. The coordination between entities controlling the VNF application(s) (e.g., OSS, NM and EM) and entities controlling the VNF platform(s) (e.g., NFVO, VNFM and VIM) may happen over standardized reference points (e.g. Os-Ma-Nfvo and Ve-Vnfm-Em).

Figure 8:
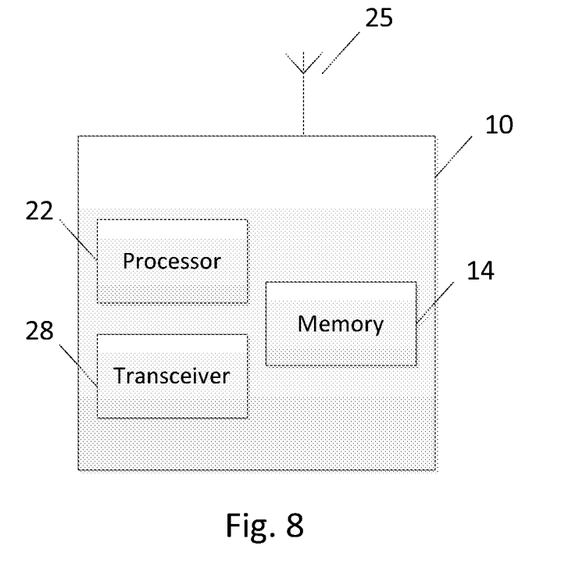
FIG. 8 illustrates a block diagram of an apparatus, according to one embodiment.

FIG. 8 illustrates an example of an apparatus 10 according to an embodiment. In an embodiment, apparatus 10 may be a node, host, or server in a communications network or serving such a network. In an embodiment, apparatus 10 may be a virtualized apparatus. For example, in certain embodiments, apparatus 10 may be an element manager and/or a virtualized network function manager as shown in FIG. 7. However, in other embodiments, apparatus 10 may be other components within a radio access network or other network infrastructure. It should be noted that one of ordinary skill in the art would understand that apparatus 10 may include components or features not shown in FIG. 8.

As illustrated in FIG. 8, apparatus 10 may include a processor 22 for processing information and executing instructions or operations. Processor 22 may be any type of general or specific purpose processor. While a single processor 22 is shown in FIG. 8, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. It should be noted that, in certain embodiments, apparatus 10 may be a virtualized apparatus and processor 22 may be a virtual compute resource.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein. In other embodiments, memory 14 may be part of virtualized compute resource or virtualized storage resource.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly. In some embodiments, transceiver 28 may be comprised of virtualized network resources.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources. As mentioned above, in certain embodiments, processor 22 may be a virtualized compute resource that may perform functions associated with virtualized network resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be an element manager or virtualized network function manager, for example. According to certain embodiments, a network function may be decomposed into smaller blocks or parts of application, platform, and resources. The network function may be at least one of a physical network function or a virtualized network function. In an embodiment, apparatus 10 may be controlled by memory 14 and processor 22 to instantiate the virtualized network function platform part. According to one embodiment, the virtualized network function platform part is instantiated by a virtualized network function manager, and apparatus 10 may be controlled by memory 14 and processor 22 to configure the virtualized network function platform part. In an embodiment, apparatus 10 may be controlled by memory 14 and processor 22 to instantiate the virtualized network function application part. According to one embodiment, the virtualized network function application part is instantiated by an element manager, and apparatus 10 may be controlled by memory 14 and processor 22 to configure the virtualized network function application part.

Figure 9:
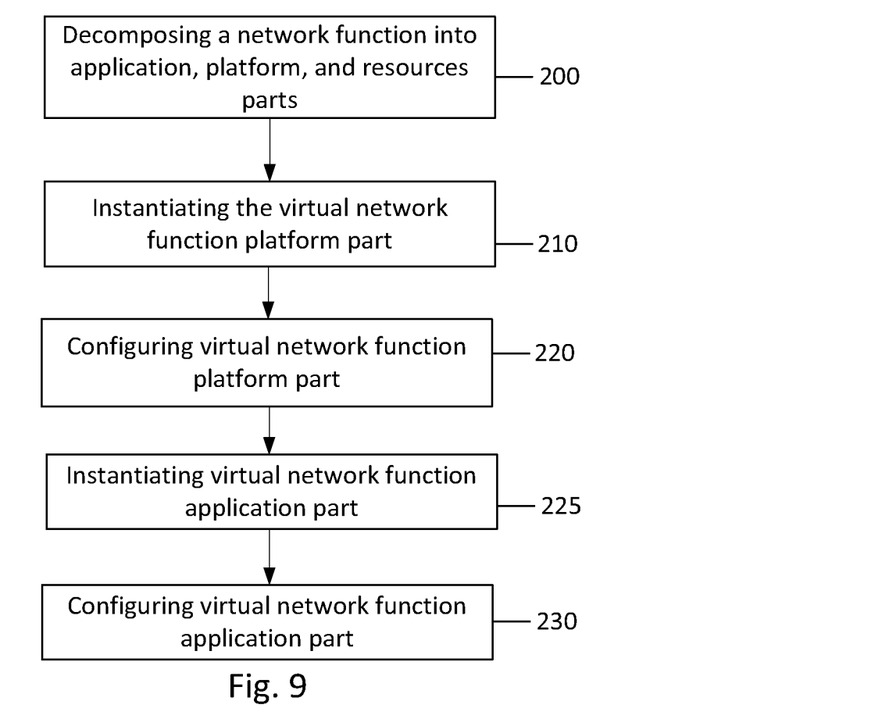
FIG. 9 illustrates an example flow diagram of a method, according to an embodiment.

FIG. 9 illustrates an example flow diagram of a method, according to one embodiment. In certain embodiments, the method of FIG. 9 may be performed by a dedicated network node, or may involve several network nodes such as an element manager, virtualized network function manager and possibly other network nodes working together. The method may include, at 200, decomposing a network function into smaller blocks or parts of application, platform, and resources. The network function may be at least one of a physical network function or a virtualized network function. In an embodiment, the method may include, at 210, instantiating the virtualized network function platform part. The instantiating may include instantiating the virtualized network function platform part by a virtualized network function manager. The method may also include, at 220, configuring the virtualized network function platform part by a virtualized network function manager. In an embodiment, the method may include, at 225, instantiating the virtualized network function application part. In an embodiment, the instantiating may further include instantiating the virtualized network function application part, for example, by an element manager. The method may also include, at 230, configuring the virtualized network function application part by an element manager.

Figure 10:
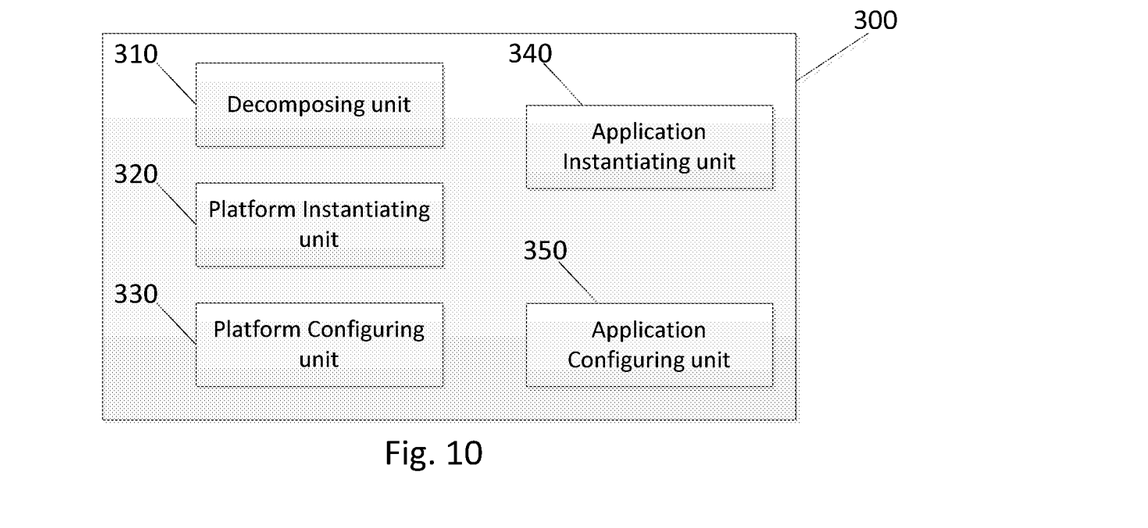
FIG. 10 illustrates a block diagram of an apparatus, according to another embodiment.

FIG. 10 illustrates a block diagram of an apparatus 300, according to another embodiment. Apparatus 300 may include a decomposing unit or means 310 for decomposing a network function into smaller blocks or parts of application, platform, and resources. The network function may be at least one of a physical network function and/or a virtualized network function. Apparatus 300 may also include a platform instantiating unit or means 320 for instantiating the virtualized network function platform part. According to one embodiment, the virtualized network function platform part is instantiated by a virtualized network function manager. Apparatus 300 may also include a platform configuring unit or means 330 for configuring the virtualized network function platform part. In an embodiment, the virtualized network function platform part is configured by a virtualized network function manager. Apparatus 300 may also include an application instantiating unit or means 340 for instantiating the virtualized network function application part. According to one embodiment, the virtualized network function application part is instantiated by an element manager. Apparatus 300 may also include an application configuring unit or means 350 for configuring the virtualized network function application part. In an embodiment, the virtualized network function application part is configured by an element manager.

According to embodiments, programs, also called program products or computer programs, including software routines, applets and macros, may be stored in any apparatus-readable data storage medium and they include program instructions to perform particular tasks. In embodiments of the present invention, there may be an application part computer program product, and a non-application part computer program product (i.e., platform computer program product). A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented by virtualization such as a virtualized compute resource(s), virtualized storage resource(s), and a virtualized network resource(s), for example.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation. In other embodiments, a virtualized apparatus, node or device may be configured as a virtualized compute or processing unit that utilizes virtualized memory, virtualized storage, and/or virtualized network resources.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
 decomposing one or more network functions into smaller blocks of an application part, platform part, and resources part, wherein the network functions comprise at least one of a physical network function or a virtualized network function;
 instantiating the virtualized network function platform part by a virtualized network function manager (VNFM);
 configuring the virtualized network function platform part by the virtualized network function manager (VNFM);
 notifying at least one of a network function virtualization orchestrator (NFVO) or an element manager (EM) about the instantiating of the virtualized network function platform part;
 instantiating the virtualized network function application part by the element manager (EM); and
 configuring the virtualized network function application part by the element manager (EM).

2. The method according to claim 1, wherein the instantiating of the virtualized network function platform part by the virtualized network function manager comprises instantiating a required amount of virtual machines with required resources.

3. The method according to claim 1, wherein the instantiating the virtualized network function application part comprises instantiating the virtualized network function application part on the instantiated virtualized network function platform part.

4. An apparatus, comprising:
 at least one processor; and
 at least one memory including computer program code;
 the at least one memory and the computer program code are configured, with the at least one processor, to cause the apparatus at least to
 decompose one or more network functions into smaller blocks of an application part, platform part, and resources part, wherein the network functions comprise at least one of a physical network function or a virtualized network function;
 instantiate the virtualized network function platform part by a virtualized network function manager (VNFM);
 configure the virtualized network function platform part by the virtualized network function manager (VNFM);
 notify at least one of a network function virtualization orchestrator (NFVO) or an element manager (EM) about the instantiating of the virtualized network function platform part;
 instantiate the virtualized network function application part by the element manager (EM); and
 configure the virtualized network function application part by the element manager (EM).

5. The apparatus according to claim 4, wherein the at least one memory and the computer program code are configured, with the at least one processor, to cause the apparatus at least to instantiate a required amount of virtual machines with required resources.

6. The apparatus according to claim 4, wherein the virtualized network function application part is instantiated on the instantiated virtualized network function platform part.

7. A computer program, embodied on a non-transitory computer readable medium, the computer program configured to control a processor to perform a process according to claim 1.

* * * * *